United States Patent [19]
Miller

[11] Patent Number: 5,425,194
[45] Date of Patent: Jun. 20, 1995

[54] FISHING ROD CASE

[76] Inventor: Matthew A. Miller, 505 Fairway Ct., Broken Arrow, Okla. 74011

[21] Appl. No.: 61,195

[22] Filed: May 12, 1993

[51] Int. Cl.$^6$ ............................................. A01K 97/08
[52] U.S. Cl. ................................... 43/26; 206/315.11; 224/922; 220/4.23
[58] Field of Search ....................... 43/26; 206/315.11; 224/922; 220/4.22, 4.23, 4.24

[56] References Cited

U.S. PATENT DOCUMENTS

| | | | |
|---|---|---|---|
| 827,736 | 8/1906 | Lamphier . | |
| 1,903,798 | 8/1933 | Turner . | |
| 2,171,053 | 8/1939 | White et al. | 224/29 |
| 2,473,977 | 6/1949 | Tutton | 224/5 |
| 2,501,270 | 3/1950 | Fleming | 224/48 |
| 2,595,230 | 5/1952 | Daviau | 43/26 |
| 2,650,449 | 9/1953 | Suring | 43/26 |
| 2,749,645 | 6/1956 | McKern | 43/26 |
| 2,919,017 | 12/1959 | Weber | 43/26 |
| 2,962,187 | 11/1960 | Morris | 220/60 |
| 3,152,716 | 10/1964 | Feldhahn | 220/4.22 |
| 3,337,028 | 8/1967 | Glavan | 206/1 |
| 3,348,329 | 10/1967 | Seeman | 43/26 |
| 3,399,009 | 8/1968 | Slade | 43/26 |
| 3,641,697 | 2/1972 | Heidtman | 43/26 |
| 3,678,611 | 7/1972 | Files | 43/26 |
| 4,063,646 | 12/1977 | Stahl, Jr. | 211/4 |
| 4,170,801 | 10/1979 | Ward | 9/1.1 |
| 4,306,601 | 12/1981 | Wallis et al. | 150/52 R |
| 4,628,628 | 12/1986 | Burgin et al. | 43/26 |
| 4,643,302 | 2/1987 | Baumgardner | 206/315.1 |

Primary Examiner—Kurt Rowan
Attorney, Agent, or Firm—Frank J. Catalano; Scott R. Zingerman

[57] ABSTRACT

A fishing rod case formed from an elongated, cylindrical tube with opposed open ends is divided into longitudinal segments, by a continuous hinge and a cut offset therefrom. The cut has a tongue and a groove extending fully along opposing edges thereof for mating when the tube is closed about the hinge. Straps mounted on an exterior surface of the tube hold the tube in this closed condition. When so mated, the tongue and groove cannot disengage even if pressure is placed on the tube surface. Resiliently compressible retainers are arranged in spaced apart opposing pairs within the tube. Each of the retainers is contoured to fit snugly in its respective tube segment. An upper portion of the retainer extends beyond the diametric dividing plane. Each retainer has several slits therein longitudinally aligned with the tube and with corresponding ones of the slits in corresponding ones of the pairs of segments. The slits extend from the upper portion of the retainer toward the base portion to axes somewhat symmetrically disposed within the tube. A segment of the upper portions of each of the retainers proximate the hinge is reduced so that the slits are distorted away from the hinge when the tongue and groove are in the mated condition. This enhances the firm grip on the rods by the retainer. A pair of end caps are secured by straps over the ends of the tube when the tongue and groove are in the mated condition.

22 Claims, 7 Drawing Sheets

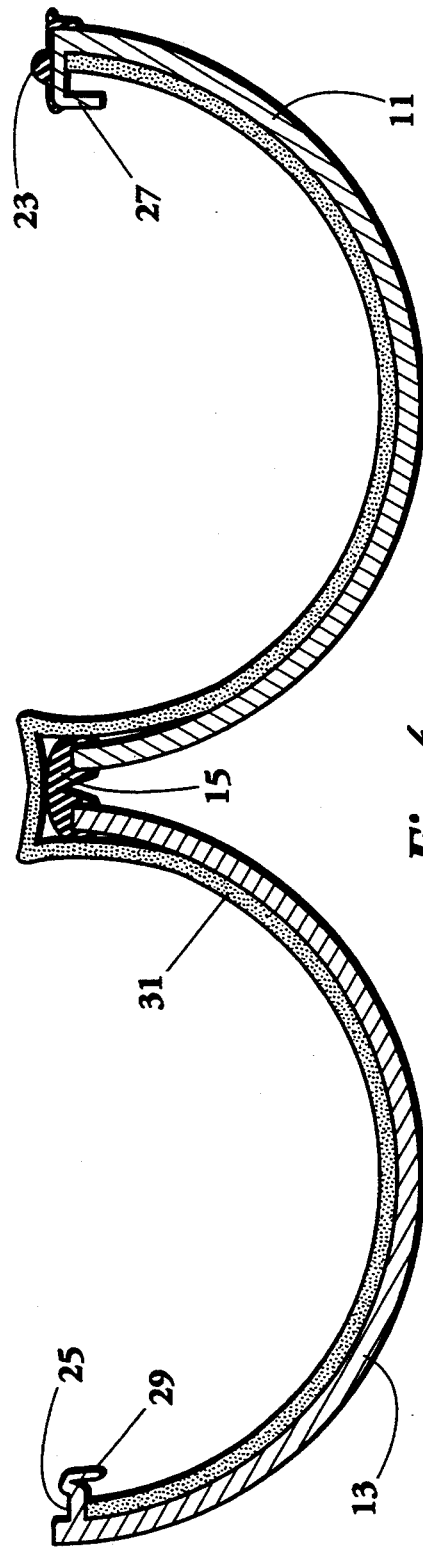
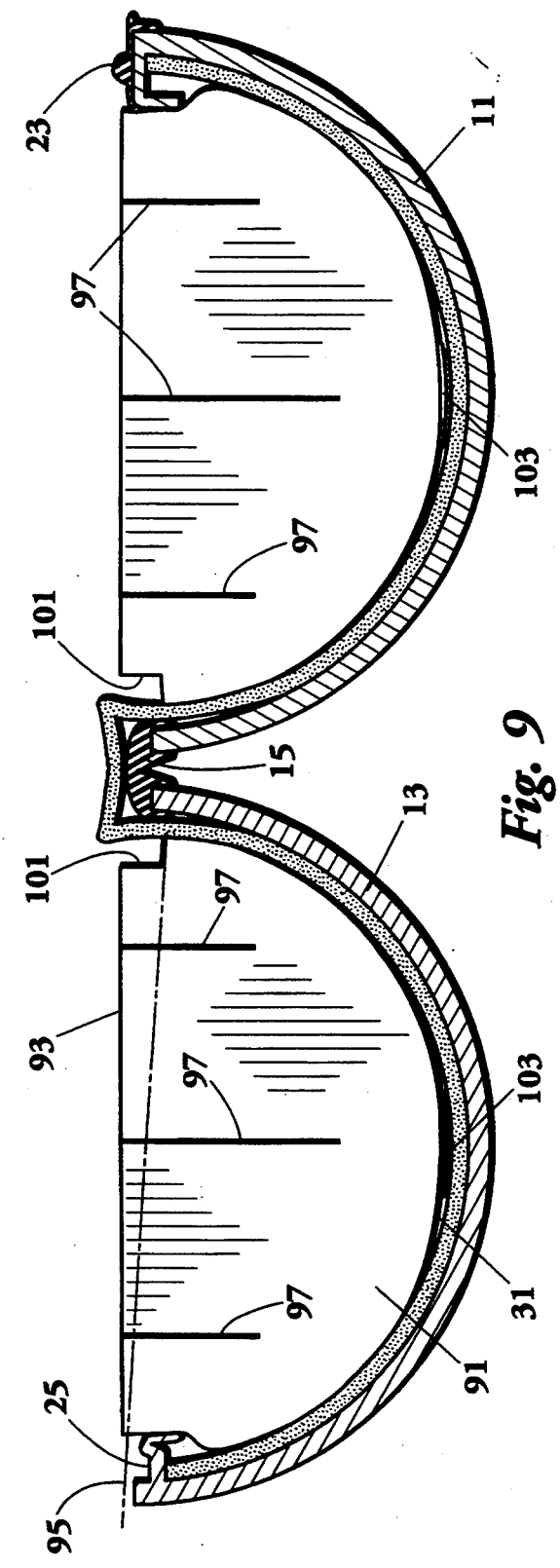

FISHING ROD CASE

BACKGROUND OF THE INVENTION

This invention relates generally to carrying cases and more particularly concerns cases suitable for carrying several fishing rods at the same A number of elongate cylindrical carrying cases have been devised for carrying fishing rods and the like which open only at either or both ends of the case and therefore require insertion of the rod in a longitudinal fashion into the tube. While such cases may be adequate for single rods, insertion of multiple rods in this manner results in damage to the rod tips, shafts and eyelets during the packing process and further makes it virtually impossible to secure each rod or rod segment in isolation from other rods or rod segments within the tube.

Several cases have been designed which open along a longitudinal axis of the case. These cases all incorporate hinges spaced apart on or extending fully along one side of the case and two or three spaced apart latches opposite the hinges for securing the case in a closed condition. These cases are generally unsatisfactory because in transport pressure on the cylinder at points between the latches causes the relatively weak edges of the cylinder to bend and misalign or even crush, resulting not only in damage to the case but often to its contents. Furthermore, while some of these cases do provide snaps or clamps to secure the rod or rod segments in place, the clamps presently used are often ineffective in maintaining the isolated relationship of the rods or rod segments during the ordinary jostling and abuse of transport. In addition, the rod clamps are fixed within the case so as to make it difficult to accommodate rods of different eyelet spacing. Moreover, the clamps themselves have sharp edges, are relatively rigid and do not firmly nestle the rod shaft with the result that eventually the shafts are scratched and worn by the clamps. Furthermore, since these cases are reliant on the strength and resiliency of the case material itself to resist the distortion and crushing above referred to, they are generally heavier and bulkier than desired for ease in carrying and transport. Then, too, the hinges and latches of these cases are independent elements fastened to the case and therefore are weak points in the structure relatively easily susceptible to damage and destruction.

In addition, aside from the inadequacies of the cases themselves, because of the hinge spacing requirements, latch spacing requirements, end closure design and fixed internal rod clamping apparata used in known cases, cases accommodating differing lengths of rods and eyelet spacings must each be made in their own unique assembly process, thus increasing the time and cost of manufacture.

It is therefore a primary object of this invention to provide a fishing rod case which will secure a plurality of fishing rods in isolated relationship from one another. It is also an object of this invention to provide a fishing rod case which, while it opens along a longitudinal axis thereof, is not readily susceptible to distortion or crushing along its edges. Another object of the present invention is to provide a fishing rod case employing retainers readily relocatable within the case to accommodate rods of differing size and eyelet spacing. Still another object of this invention is to provide a fishing rod case having retainers which lock the rod in a stored condition without rigid or sharp surfaces coming in contact with the rod shaft or eyelets. A further object of this invention is to provide a fishing rod case consisting of a longitudinal cylinder, a full length hinge and edge connectors of unitary construction, preferably formed in a single extrusion process, and thus minimize weaknesses in the device. It is also an object of this invention to provide a fishing rod case that can be readily manufactured in a variety of lengths to accommodate many lengths of rods.

SUMMARY OF THE INVENTION

In accordance with the invention, a fishing rod case is provided in which an elongated, cylindrical tube having opposed open ends is divided into longitudinal segments, preferably diametrically, by a hinge and a cut offset therefrom, both extending continuously between the open ends of the tube. The cut has a tongue extending fully along one edge thereof and a groove extending fully along an opposing edge thereof :for mating with the tongue when the tube is closed about the hinge. Straps mounted on an exterior surface of the tube hold the tube in this closed condition. When so mated, the tongue and groove cannot disengage even if pressure is placed on the tube surface. At least four resiliently compressible retainers are arranged in spaced apart opposing pairs within the tube. Each of the retainers is contoured to fit snugly in its respective tube segment. Preferably, a semi-cylindrical base of substantially same outer diameter as an inner diameter of the tube is snugly seated in a semi-cylindrical tube segment. An upper portion of the retainer extends beyond the diametric dividing plane. Each retainer has several, preferably three, slits therein longitudinally aligned with the tube and with corresponding ones of the slits in corresponding ones of the pairs of segments. The slits extend from the upper portion of the retainer toward the base portion to axes somewhat symmetrically and preferably concentrically and equally angularly disposed within the tube. Preferably, each of the slits is transverse to a diametric surface of a semicylindrical base and a segment of the upper portions of each of the retainers proximate the hinge is reduced so that the slits are distorted away from the hinge when the tongue and groove are in the mated condition. This enhances the firm grip on the rods by the retainer. A pair of end caps are also provided, together with straps for securing them over the ends of the tube when the tongue and groove are in the mated condition. Preferably, each of the end caps will have a resiliently compressible member attached therein for insertion into the open tube ends when the end caps are secured in place. These members further protect the ends of the rods.

It is also preferable to dispose a liner along the interior of the tube, preferably of a hook and loop material, which can be mated with opposing segments of hook and loop material fixed to the retainer so that the retainer can be easily and securely relocated in the case. Preferably, the tube is polyvinyl chloride and the tongue and hinge are flexible polyvinyl chloride, all simultaneously extruded as an integral unit for strength of structure and simplicity of manufacture of tubes of varying length.

BRIEF DESCRIPTION OF THE DRAWINGS

Other objects and advantages of the invention will become apparent upon reading the following detailed description and upon reference to the drawings in which:

FIG. 4 is a cross-sectional view taken along the line 4—4 of FIG. 2;

FIG. 9 is a cross-sectional view illustrating the fishing rod case of FIG. 1 with a mating pair of retainers of FIG. 6 disposed therein and in the open condition;

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
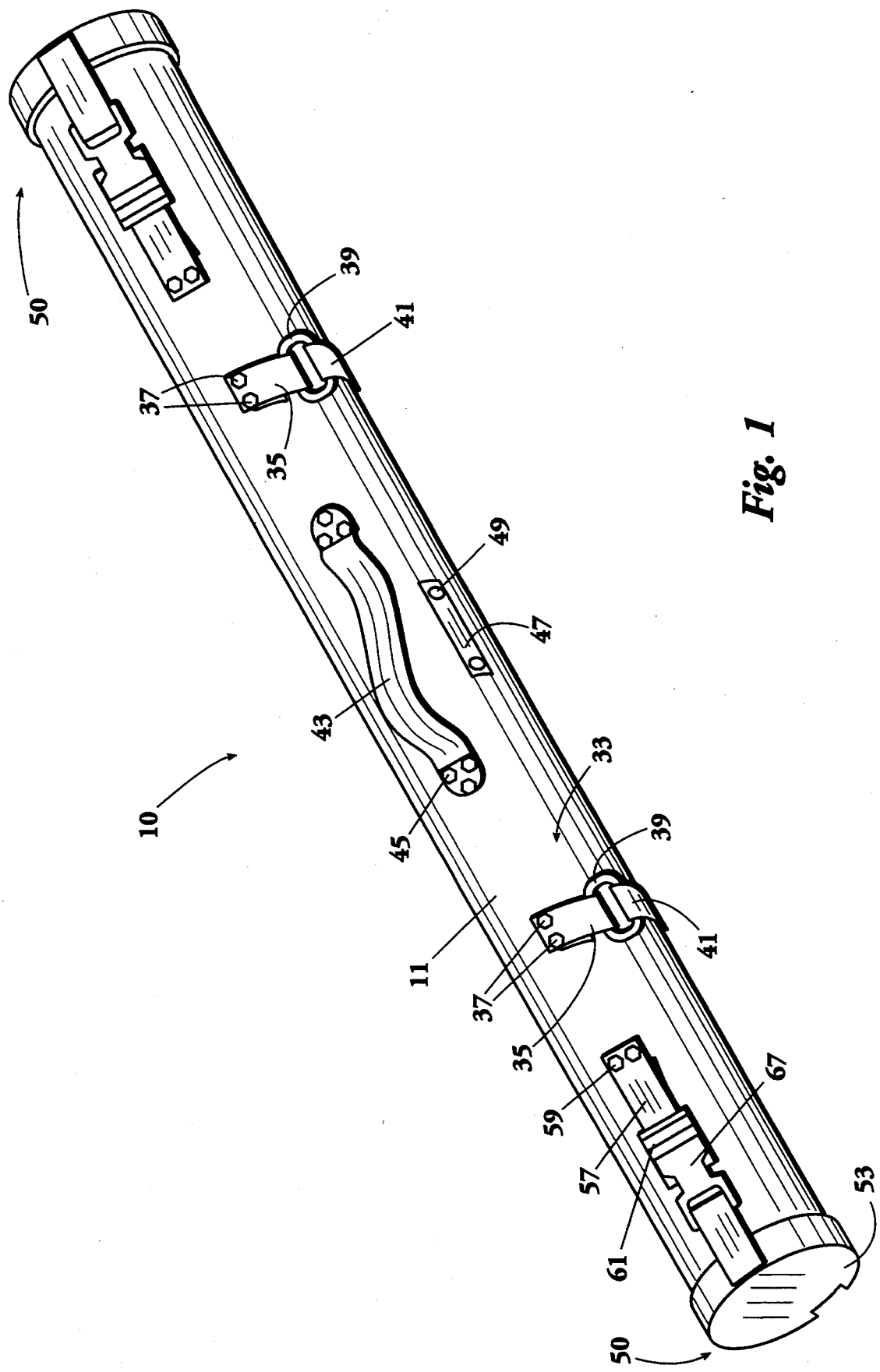
FIG. 1 is a perspective view illustrating a preferred embodiment of the fishing rod case in a closed condition.
Figure 2:
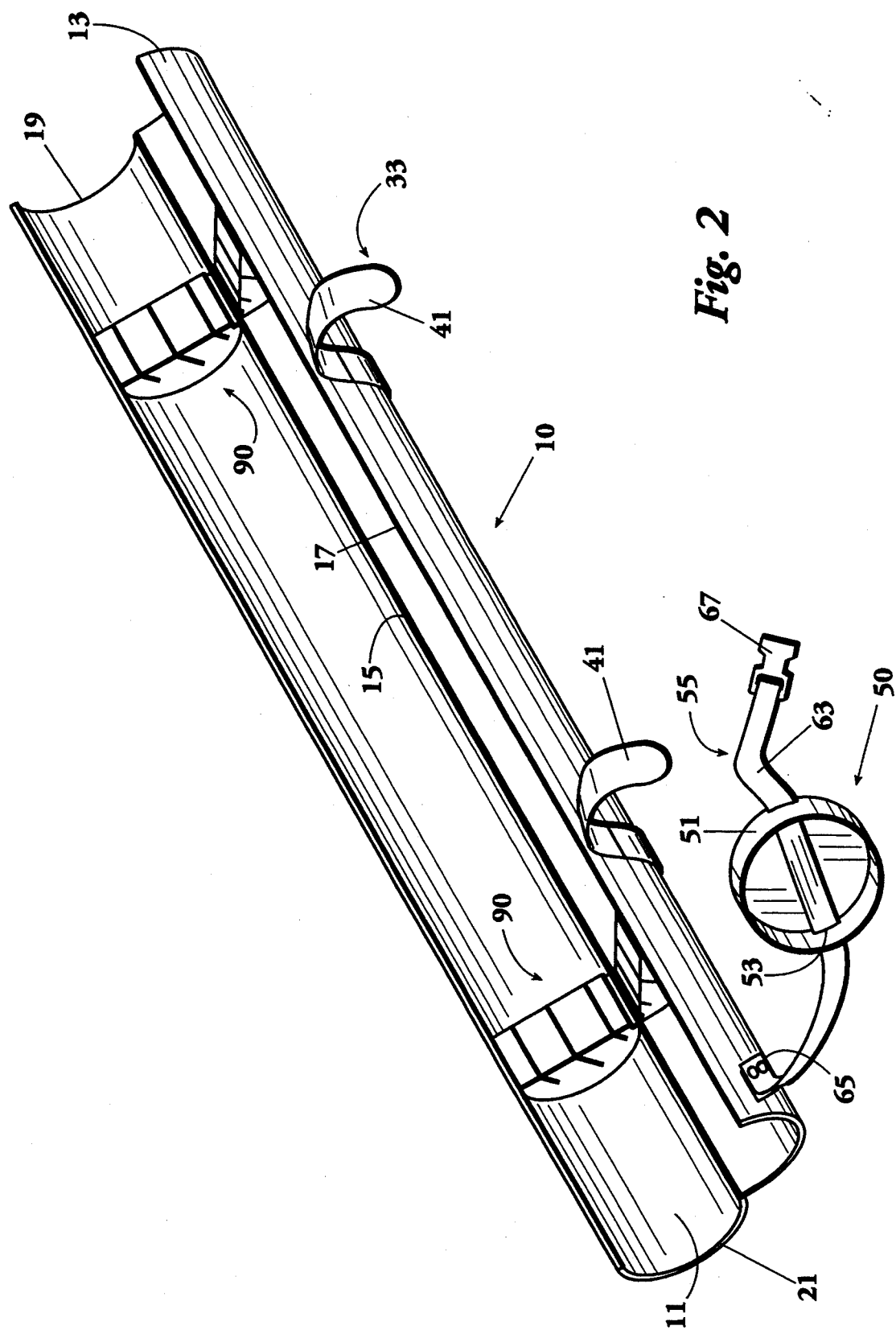
FIG. 2 is a perspective view of the case of FIG. 1 in open condition.
Figure 3:
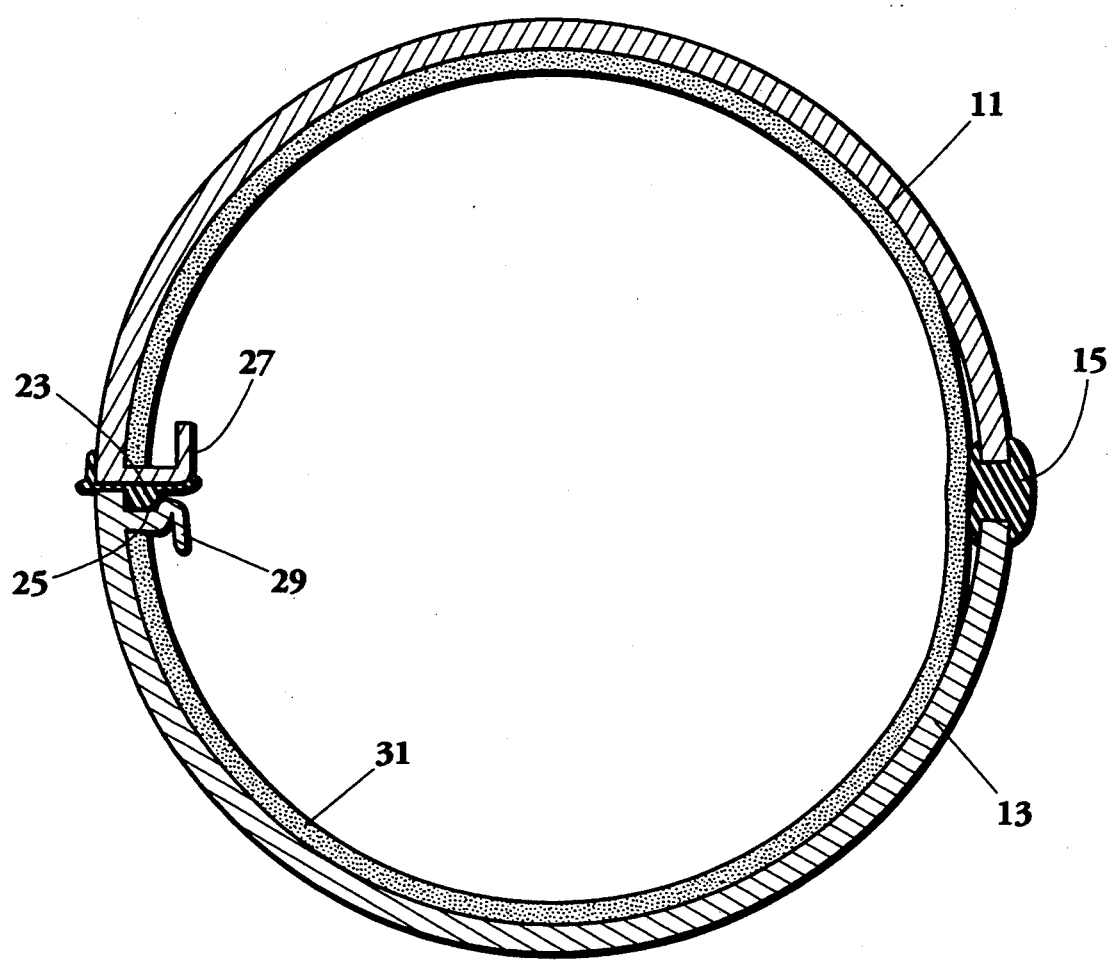
FIG. 3 is a cross-sectional view taken along the line 3—3 of FIG. 1.

Turning to FIGS. 1 and 2, a preferred embodiment of the fishing rod case includes an open ended tubular member 10 and a pair of detachable end caps 50 for closing the open ends of the tubular member 10. As shown, the tubular member 10 is circularly cylindrical and is divided longitudinally into segments 11 and 13 by a hinge 15 and a cut 17, the hinge 15 and the cut 17 both extending continuously from one end 19 to the other end 21 of the tubular member 10. Preferably, the hinge 15 and cut 17 are diametrically opposed in relation to the member 10 so that the segments 11 and 13 are semicircular in cross-section. As best seen in FIGS. 3 and 4, the cut edge of one segment 11 has a tongue 23 extending fully from one end 19 to the other end 21 of the tubular member 10. The cut edge of the other segment 13 has a groove 25 extending fully from one end 19 to the other end 21 of the tubular member 10. Preferably, the segments 11 and 13 will be extruded polyvinyl chloride and the hinge 15 and tongue 23 will be flexible polyvinyl chloride extruded simultaneously with the segments 11 and 13. In addition, in the preferred embodiment, the cut edges of the segments 11 and 13 will be C-shaped inwardly in the tubular member 10 so as to provide interior flanges 27 and 29 for securing a thin liner 31 along the entire interior surface of the tubular member 10. Preferably, the liner 31 will be of a relatively soft hook and loop type material for reasons to be hereinafter explained. While in the preferred embodiment the tubular member 10 is circularly cylindrical and will typically have an inner diameter in the range of approximately four inches, the member 10 may be of any desired size and cross-section, such as elliptical, rectangular or other configuration. Furthermore, the hinge 15 and cut 17 need not necessarily be diametrically opposed or define symmetric segments 11 and 13. However, for simplicity, speed and cost considerations, simultaneously extruded segments 11 and 13, hinges 15 and tongues 17 may be readily cut at any desired intervals to provide cases of any of a variety of desired lengths.

Each of the tubular members 10 is provided with at least one and preferably at least two fastening straps 33 spaced apart on its outer surface. As shown, each strap 33 includes a first portion 35 having one end fastened to the tongue segment 11 by pop rivets 37 or the like and the other end connected to a D-ring 39. The second portion 41 of the strap 33 is fastened at one end to the grooved segment 13 of the tubular member 10 so that its free end can be inserted through the D-ring 39. As shown, the strap 33 will preferably include a portion of hook and loop material so that it can be folded over itself and secured.

Figure 5:
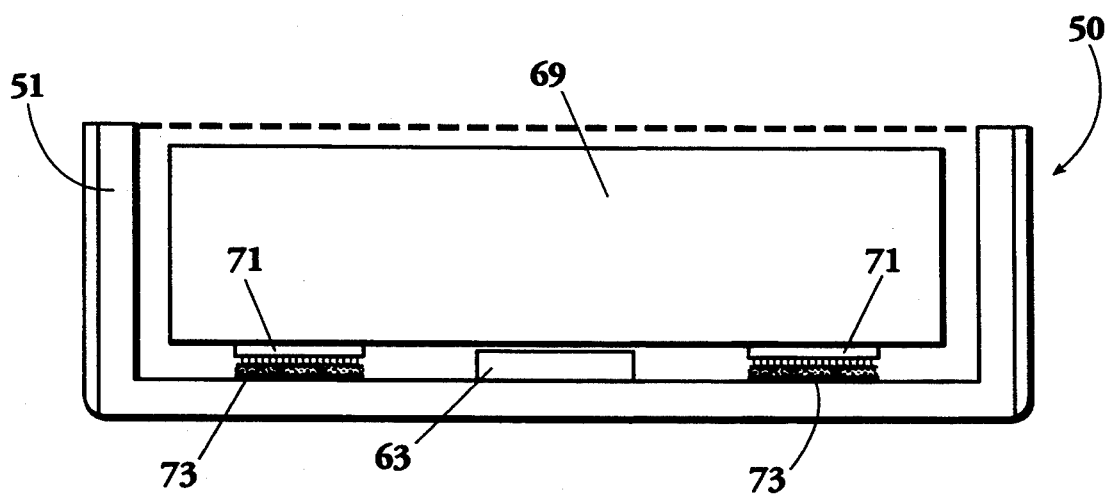
FIG. 5 is a cross-sectional view taken along the line 5—5 of FIG. 1.

Turning to FIGS. 1, 2, and 5, each of the end caps 50 consists of a cup-like portion 51 contoured to be slipped over the end of the tubular member 10 when the tubular member 10 is in the closed condition. Preferably, the end caps 50 are made of polypropylene. As illustrated with respect to the preferred circularly cylindrical embodiment, the caps 50 will be substantially circular and are provided with a pair of diametrically opposed slots 53 at the bottom of the cup. An end cap retaining strap 55 consists of a first portion 57 with one end fastened to the tongue segment 11 of the tubular member 10 by pop rivets 59 or the like and its other end terminating in a buckle element 61. The second portion 63 of the retaining strap 55 has one end fastened to the groove segment 13 of the tubular member 10 by pop rivets 65 or the like and extends through the slots 53 in the end cap 50 to a mating element 67 for the buckle element 61 of the first portion 57 of the end cap retaining strap 55.

The tubular member 10 is further provided with a carrying handle 43 which is preferably secured by pop rivets 45 or the like in longitudinal alignment with the axis of the tubular member lid, preferably at the center of the case and between the fastening straps 33. In addition, the case may also be provided with an owner's ID tag 47 secured to the outer surface of one of the segments 11 or 13 by pop rivets 49 or the like.

In the preferred embodiment and as best seen in FIG. 5, each end cap 50 is provided with a resiliently compressible member 69 secured to the inside base of the cup-like portion 51 with the second portion 63 of the retaining strap 55 sandwiched therebetween. This is preferably done with mating segments 71 and 73 of hook and loop material so as to permit the strap 55 to slide easily between the base of the cup and the resiliently compressible member 69. Preferably, the resiliently compressible member 69 will be contoured to fit easily into but over a substantial area of the open end of the tubular member 10 so as to afford additional protection to the tips and ends of the rods inside the case. As shown, for the circularly cylindrical case, the resiliently compressible member 69 will be a concentrically circular cylinder insertable into the tubular member 10 in its closed condition.

Figure 8:
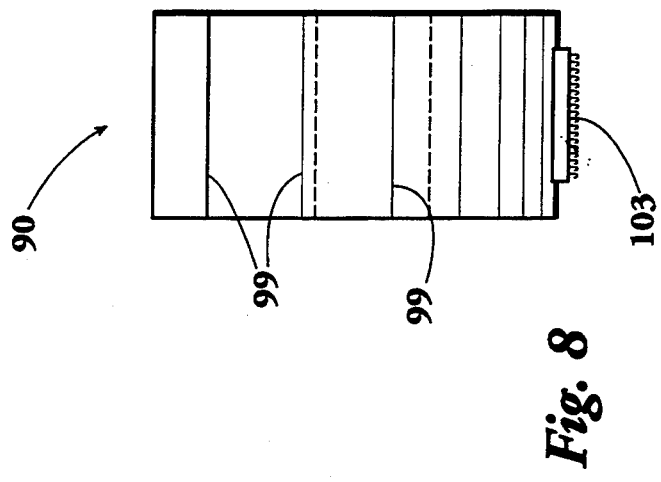
FIG. 8 is a side elevation view of the retainer of FIG. 6.
Figure 6:
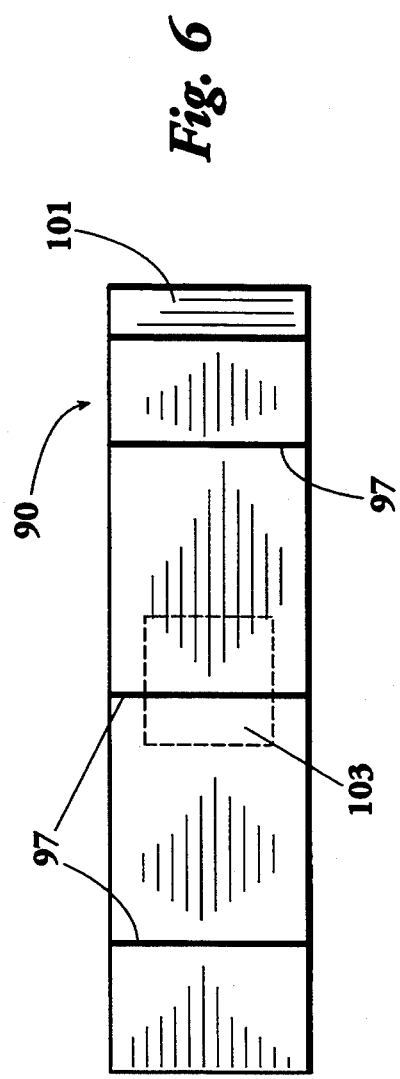
FIG. 6 is a top plan view of a preferred embodiment of a retainer for use with the fishing rod case.
Figure 7:
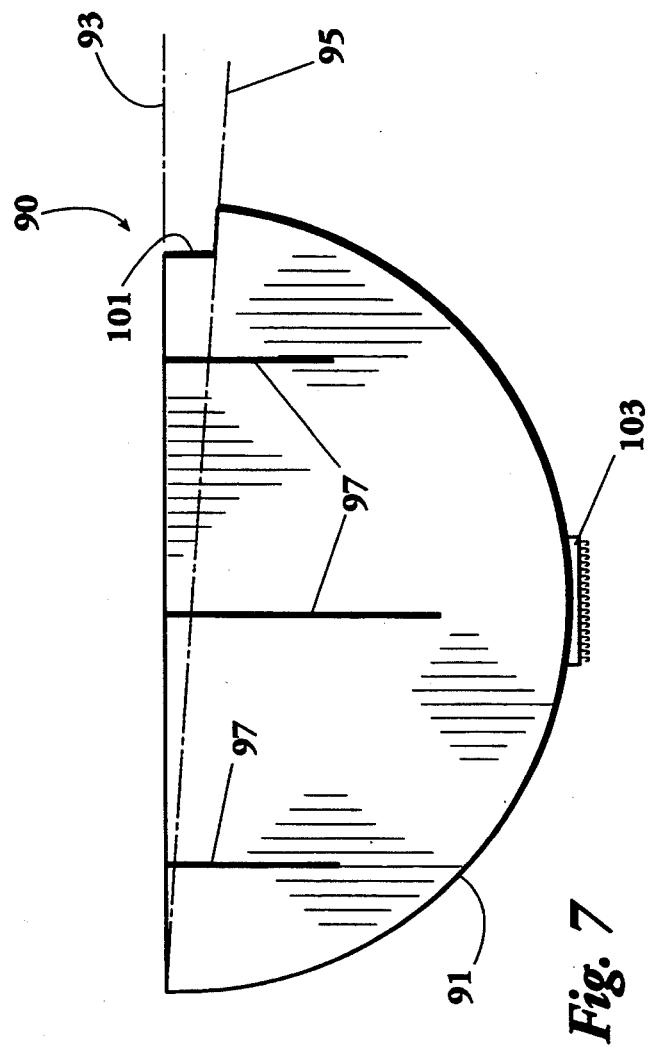
FIG. 7 is a front elevation view of the retainer of FIG. 6.
Figure 10:
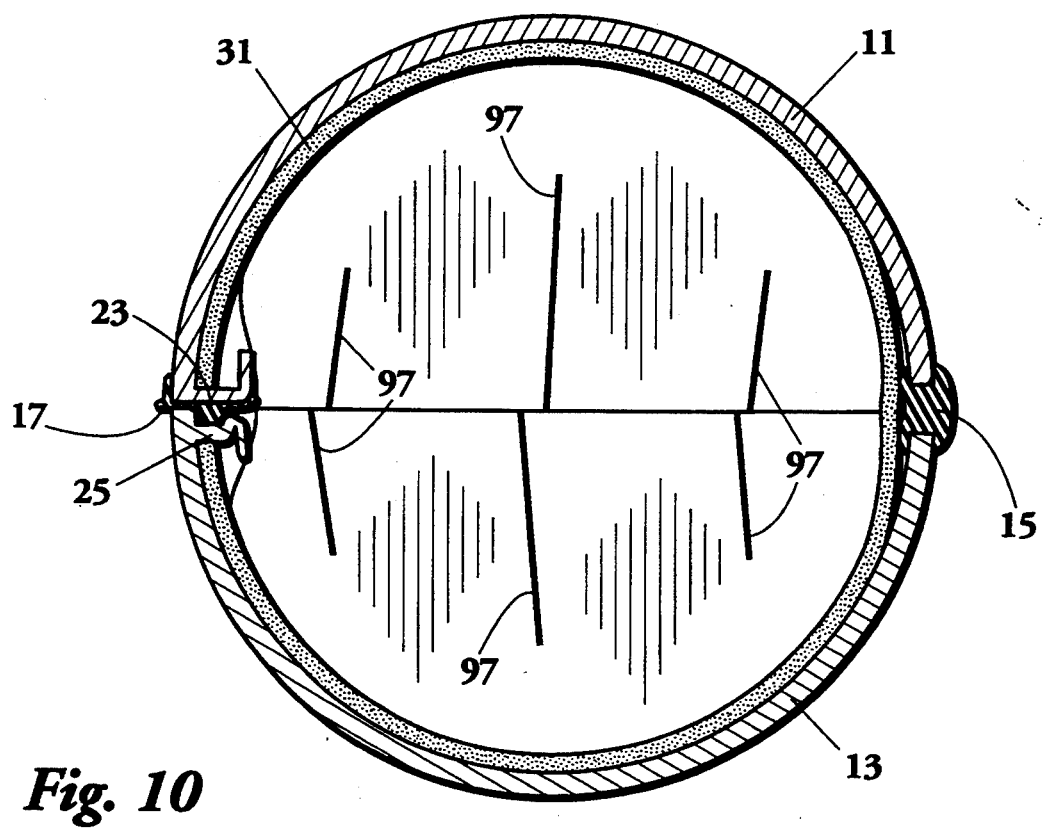
FIG. 10 is a cross-sectional view illustrating the fishing rod case of FIG. 1 with a mating pair of retainers of FIG. 6 disposed therein in the closed condition.

To secure the rods in the case, resiliently compressible retainers 90 are arranged in opposing pairs at intervals along the interior of the tubular member 10 as shown in FIG. 2. As best seen in FIGS. 6, 7 and 8, each of the retainers 90 has a base 91 symmetrical with and seated in one of the tube segments 11 or 13. Each retainer extends at least to a plane 93 which is coincident with the plane 95 defined by the hinge 15 and the cut 17 which divide the tubular member 10 into its mating segments 11 and 13. Each of these retainers 90 has a plurality of slits 97 arranged to align longitudinally with the tubular member 19 when the retainer 90 is seated in its segment 11 or 13. Thus, when retainers 90 are appropriately spaced apart and aligned in the same segment 11 or 13 of the case, corresponding slits 97 in the retainers 90 will be longitudinally aligned within the tubular member 10. Each of the slits 97 extends into its retainer 90 from the plane 93 of its base 91 toward the wall of the tubular member 10, preferably to axes 99 which are symmetrically disposed within the tubular member 10. As shown in FIGS. 9 and 10, the plane 93 of the retainer 90 in the preferred embodiment will extend beyond the plane 95 of the segments 11 or 13. Thus, when the retainers 90 are aligned in opposing pairs in their respective segments 11 and 13, a portion of the retainers extends beyond each of the segments 11 or 13 so that the opposing pairs of retainers 90 will be compressed when the tongue 23 and groove 25 of the tubular member 10 are in the mated condition. Furthermore, in the preferred embodiment, the portion of the retainer 90 proximate the hinge 15 and extending beyond the tube dividing plane 95 is lower than the rest of the retainer 90. This is accomplished by providing a notch 101 or a bevel or taper to this portion of the retainer 90. As a result, when the tongue 23 and groove 25 are mated as the case is closed about the hinge 15, the portions of the retainers 90 which extend beyond the plane 95 of the segments 11 or 13 are caused to compress from the hinge 15 toward the cut 17, thus distorting the slits 97 to curve somewhat toward the cut 17. In the preferred embodiment shown, the slits 97 are not only longitudinally aligned within the tubular member 10 but are also transverse to the planes 93 and 95 of the base 91 and segments 11 and 13. Furthermore, in the preferred embodiment, the slits 97 will extend into the retainers 90 to axes 99 which are concentrically disposed within the tubular member 10. Preferably, cases in the range of three, four or five foot in length, will have two pairs of opposing retainers 90 spaced apart within the tubular member 10 while cases in the range of six foot or seven foot in length will have three pairs of opposing retainers 90 in spaced apart relationship within the tubular member 10. The outer contour of the retainers 90 is complementary to the inner contour of the tubular member 10. Preferably, for example, if the tubular member 10 has a circularly cylindrical member of four inches inner diameter, the retainer 90 will have a base portion having a four inch outer diameter. Thus, with the liner 31 disposed along the interior surface of the tubular member 10, retainers 90 inserted into the segments 11 or 13 will be slightly compressed because of the space taken by the liner 31 so that the retainers 90 will be snugly held in position within the tubular member 10. In the preferred embodiment shown, to further assure the firm seating of the retainers 90 within the tubular member 10, the outer surface of the base 91 of the retainer is provided with a segment of mating hook and loop material 103 for engagement with the hook and loop material of the liner 31. The retainers 90 are preferably made of polyurethane. Other suitable material may be used.

Rod cases of varying lengths can be made with little variation in the manufacturing process. With the tube segments 11 and 13, hinge 15 and tongue 23 being simultaneously extruded, the tubular members 10 can be cut at any desired length. No change in end caps 50, fastening straps 33 or carrying handles 43 are necessary. After these components have been fastened by their respective pop rivets to the segments 11 and 13, the liner 31 is applied to the inside surface of the tube and the assembly of the fixed portions of the case is complete.

Figure 12:
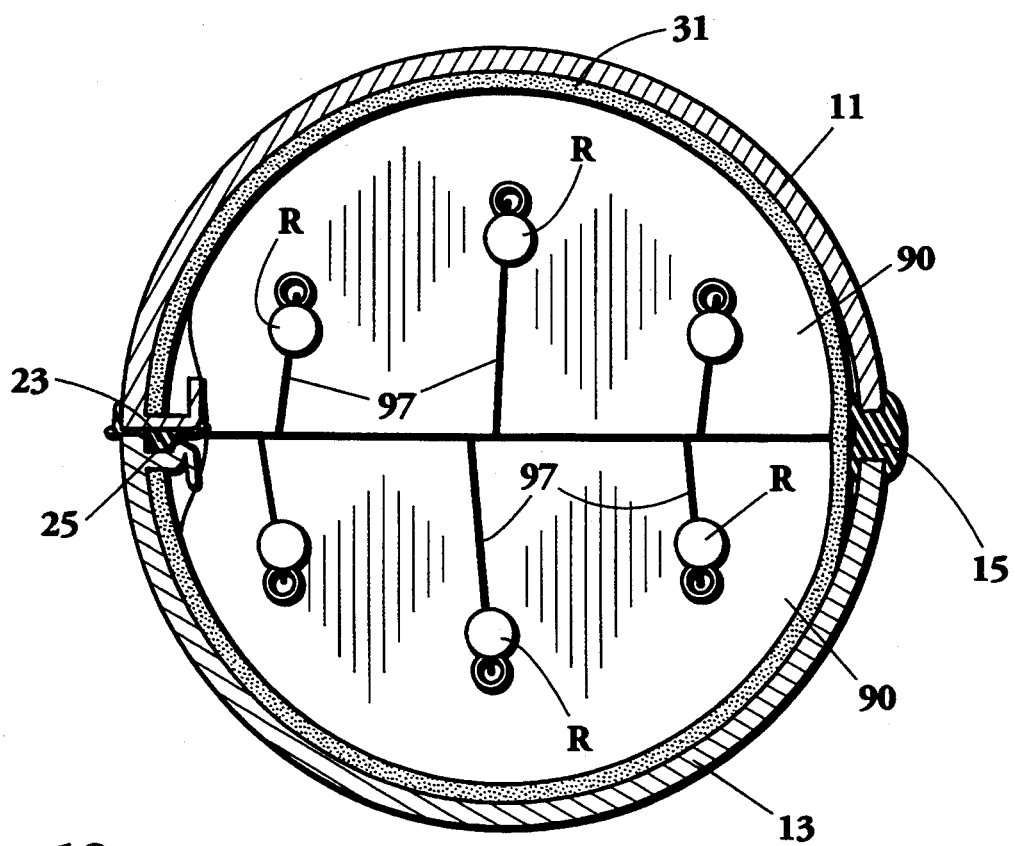
FIG. 12 is a cross-sectional view illustrating the disposition of the rods within the retainers and the case in a closed condition.
Figure 11:
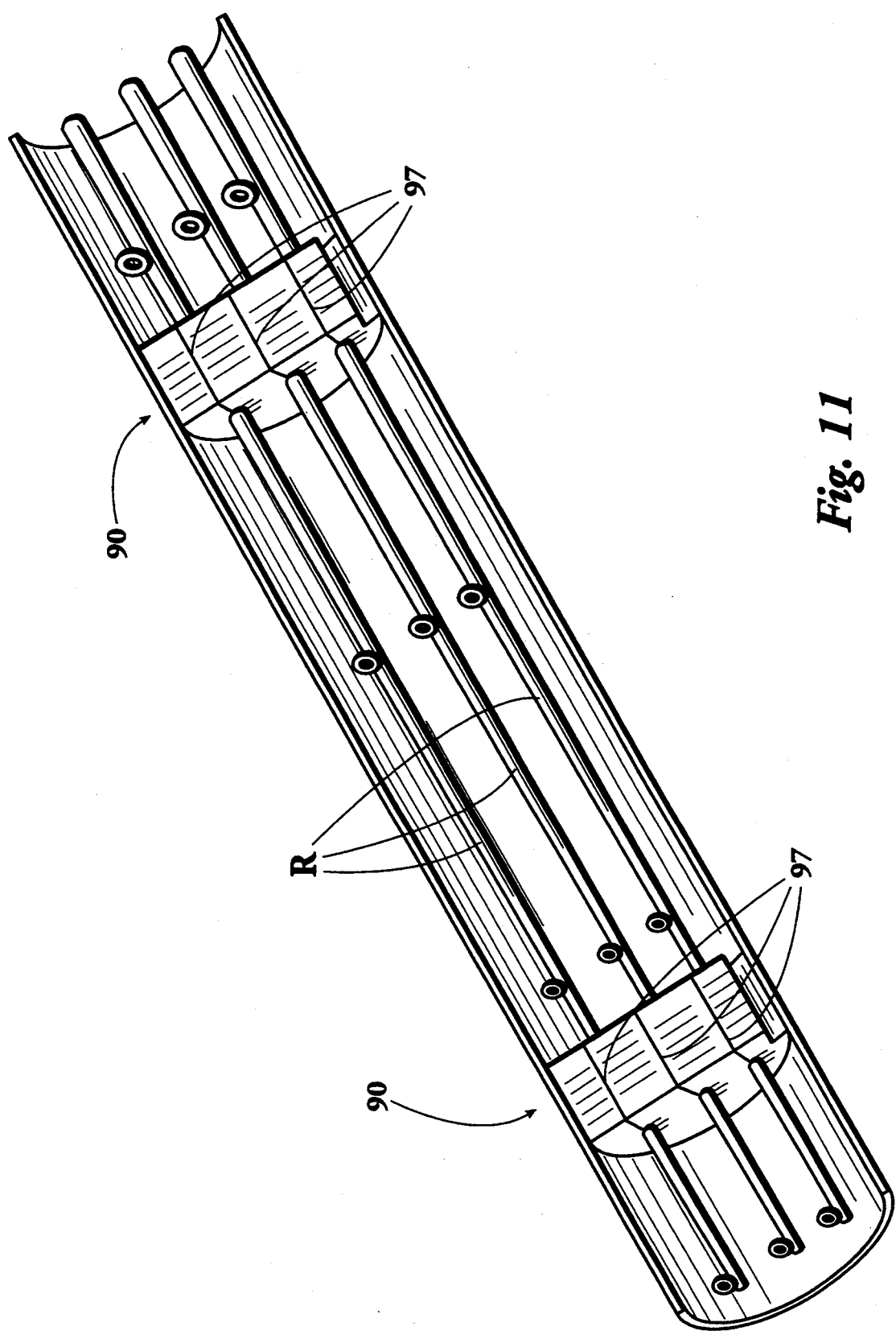
FIG. 11 is a top plan view of a portion of the fishing rod case of FIG. 1 in the open condition with mating pairs of retainers inserted therein and supporting a plurality of fishing rods with the case in an open condition.

Looking now at FIGS. 11 and 12, for use in transporting rods R, two or more pairs of opposing retainers 90 are located within the tubular member 10 in spaced apart relationship in any location selected by the user to accommodate the positioning of the rods and eyelets within the tubular member 10. With the retainers thus located within the tubular member 10 and preferably secured in place by the hook and loop engagement of the retainers 90 to the liner 31, the rods R are inserted longitudinally into corresponding slits 97 in the retainers 90, the rods R preferably being fully inserted to the outer ends of the slits 97. Since there are no holes or cut-outs provided in the slits 97, and since the container 90 is snugly seated or partially compressed within the tubular member 10 by reason of the liner 31, the portions of the rods R inserted into the slits 97 are entirely snugly surrounded by the retainer 90 due solely to the compression of the resiliently compressible retainer. With all the rods R thus inserted into their respective slits 97, the case is closed about the hinge 15 to draw the tongue 23 and groove 25 into the mated condition. As this closure takes place, if the plane 93 of the retainers 90 extends beyond the plane 95 of the segments 11 and 13 as preferred, the retainers 90 will also be compressed from their portion proximate the hinge 15 toward their portion proximate the mating tongue 23 and groove 25 so as to distort the slit 97 and further secure the rods therein. When the tongue 23 and groove 25 are mated along the entire length of the tubular member 10, the tubular member 10 is secured in its closed condition by use of the fastening straps 33 which, when tautly drawn, assure that the tongue 23 will not be disengaged from the groove 25. This condition is further assured by the placement of the end caps 50 over their respective ends of the tubular member 10, the contour of the cup-like portion 51 of the end cap 50 being such as to assure that the tongue 23 and groove 25 are held in the mated condition. With the end cap thus positioned, the end cap retaining strap 55 is buckled to secure the end cap 50 in place on the end of the tubular member 10. This secured arrangement of the tongue 23 and groove 35 along the entire length of the case affords a condition of strength rather than weakness in the case. That is, pressure applied to the case during transportation and handling will not cause the cut edge of the tubular member 10 to distort so that the opposing edges of the cut are no longer aligned. Thus, the integrity and strength and therefore the safety of the fishing rods it contains is enhanced.

Thus, it is apparent that there has been provided, in accordance with the invention, a fishing rod case that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A case for holding a plurality of fishing rolls comprising:
    an elongated cylindrical tube having opposed open ends and divided into longitudinal segments along a plane defined by a hinge and a cut offset therefrom extending continuously between said open ends, said cut having a tongue extending fully along an edge thereof and a groove extending fully along an opposing edge thereof for mating with said tongue when said tube is closed about said hinge;
    means mounted on an exterior surface of said tube for fastening said tube in a condition with said tongue mated with said groove; and
    a plurality of resiliently compressible retainers arranged in opposing pairs at intervals along an interior of said tube, each of said retainers having a base symmetrical with and seated in its respective one of said tube segments and extending at least to a plane coincident with said tube dividing plane, each of said retainers having plurality of slits therein longitudinally aligned with said tube and with corresponding said slits in corresponding aligned ones of said retainers, each of said slits extending from said at least coincident plane toward said base portion to axes within said tube whereby rods longitudinally aligned in said tube and fully inserted into corresponding ones of said slits are firmly held within the tube, said at least coincident plane being beyond said tube dividing plane whereby opposing pairs of retainers are compressed when said tongue and groove are in said mated condition.

2. A case according to claim 1, a segment of said retainers proximate said hinge being lower than said at least coincident plane whereby said slits are transversely distorted when said tongue and groove are in said mated condition.

3. A case according to claim 1, said fastening means comprising at least one strap and means for securing said strap tautly about said tube when said tongue and groove are in said mated condition.

4. A case according to claim 1, said retainers being formed of polyurethane.

5. A case according to claim 1, said slits being transverse to said tube dividing plane.

6. A case according to claim 5, said case being circularly cylindrical and said axes being arranged concentrically therein.

7. A case according to claim 1 further comprising a pair of end caps and means for securing said end caps over said ends of said tube when said tongue and groove are in said mated condition.

8. A case according to claim 7, each of said end caps having a resiliently compressible member attached therein and contoured for insertion into said open tube ends when said end caps are secured over said ends.

9. A case according to claim 1 further comprising a liner disposed along said interior of said tube.

10. A case according to claim 9 further comprising means for securing said retainers to said liner.

11. A case according to claim 10, said securing means comprising mating segments of hook and loop fastener.

12. A case according to claim 11, said tube being polyvinyl chloride and said hinge being flexible polyvinyl chloride simultaneously extruded as an integral unit.

13. A case according to claim 12, said tongue being flexible polyvinyl chloride simultaneously extruded with said tube and said hinge as an integral unit.

14. A case for holding a plurality of fishing rods comprising:
    an elongated, circularly cylindrical tube having opposed open ends and diametrically divided into longitudinal segments by a hinge and a cut offset therefrom extending continuously between said open ends, said cut having a tongue extending fully along an edge thereof and a groove extending fully along an opposing edge thereof for mating with said tongue when said tube is closed about said hinge;
    means mounted on an exterior surface of said tube for fastening said tube in a condition with said tongue mated with said groove; and
    at least four resiliently compressible retainers arranged in spaced apart opposing pairs within said tube, each of said retainers having a semi-cylindrical base of substantially same outer diameter as an inner diameter of said tube snugly seated in one of said tube segments and an upper portion extending beyond said base, each of said retainers having three slits therein longitudinally aligned with said tube and with corresponding ones of said slits in corresponding ones of said pairs of segments and extending from said upper portion toward said base portion to axes disposed within said tube.

15. A case according to claim 14, each of said slits being transverse to a diametric surface of its semicylindrical base and a segment of each of said upper portions proximate said hinge being reduced in relation to said upper portions whereby said slits are distorted when said tongue and groove are in said mated condition.

16. A case according to claim 14, said fastening means comprising at least one strap and means for securing said strap tautly about said tube when said tongue and groove are in said mated condition.

17. A case according to claim 14 further comprising a pair of circularly cylindrical end caps having an open end and a closed end and means for securing said end caps over said ends of said tube when said tongue and groove are in said mated condition, each of said end caps having a resiliently compressible, circularly cylindrical member attached concentrically therein to said closed end for insertion into said open tube ends when said end caps are secured thereover.

18. A case according to claim 14 further comprising a liner disposed along said interior of said tube and means for securing said retainers to said liner.

19. A case according to claim 14, said tube being polyvinyl chloride and said tongue and said hinge being flexible polyvinyl chloride, said tube, tongue and hinge being simultaneously extruded as an integral unit.

20. A case according to claim 14, said axes being symetrically arranged within said tube.

21. A case according to claim 14, said axes being concentrically disposed within said tube.

22. A case according to claim 21, said axes being equally angularly displaced within said tube.

* * * * *